United States Patent Office 3,428,092
Patented Feb. 18, 1969

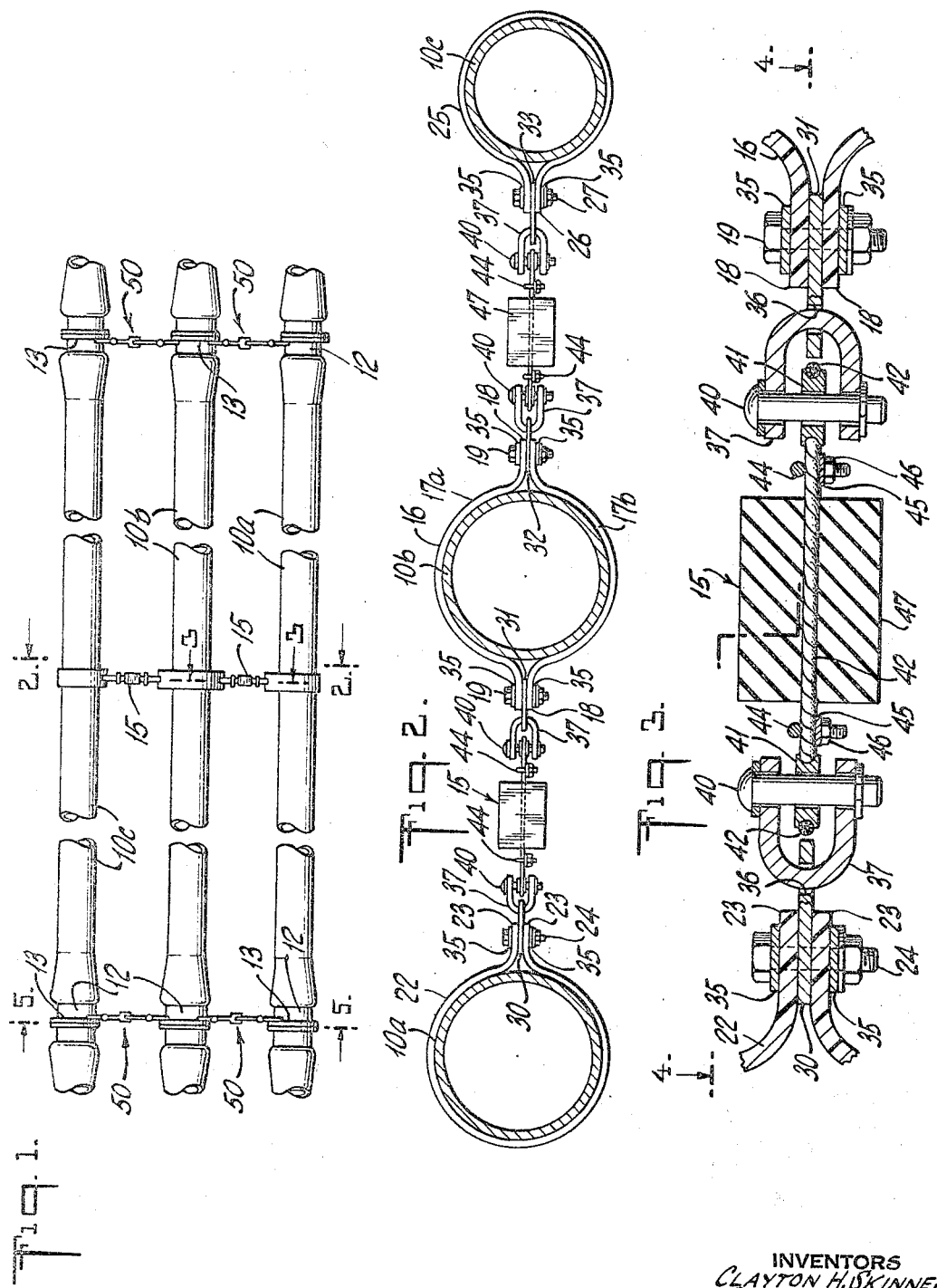

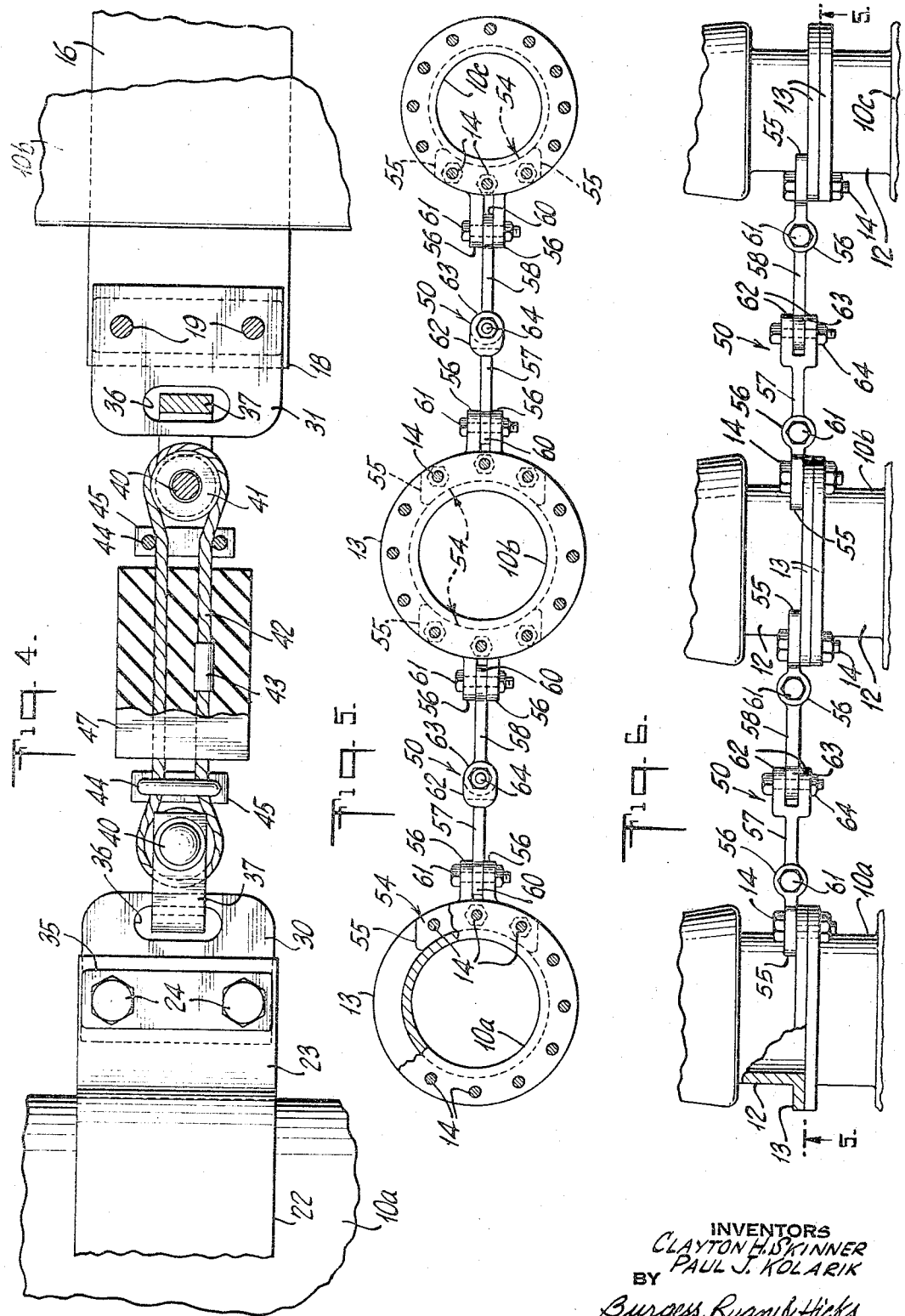

3,428,092
MARINE HOSE CONNECTOR
AND SPACER DEVICE
Clayton H. Skinner and Paul J. Kolarik, Buffalo, N.Y., assignors to Hewitt-Robins Incorporated, Stamford, Conn.
Filed Nov. 2, 1966, Ser. No. 591,502
U.S. Cl. 138—110    19 Claims
Int. Cl. F16l 3/22, 57/00

The present invention relates to a device for connecting and spacing a plurality of parallel hose, so immersed in water, as for example, by floating, as to be subject to the undulating and straining action of marine waves and currents.

Certain types of flexible, reinforced, marine hose, such as those designed to carry oil and gasoline, may be, for example, 8" to 24" in inside diameter, may be made up of lengths about 30 feet long, from mounting flange to mounting flange, and may be required to be connected in parallelism. Such parallel hose assembly may be floated on water, as for example, for ship to shore or shore to ship delivery, and may be subject to the forceful action of marine waves and currents. Comparatively large areas of these hose are subjected to the action of these waves and currents, and if the hose are interconnected by rigid devices, these devices may be damaged and the hose themselves may be injured under the hammering and straining action of these waves and currents.

One object of the present invention is to provide new and improved devices for connecting and spacing a plurality of parallel, flexible, marine hose in such a way as to resist effectively the destructive action of marine waves and currents on said hose.

In carrying out certain features of the present invention, the hose connector and spacer devices between parallel hose are yieldable in generally predetermined universal directions, permitting relative movements of the hose and thereby dampening the straining actions of the waves and currents on said devices and said hose, while maintaining said hose substantially parallel.

Various other objects and features of the invention are apparent from the following description and from the accompanying drawings, in which FIG. 1 is a top plan view of a series of flexible marine hose shown tied together in parallelism by hose connector and spacer devices embodying the present invention;

FIG. 2 is a section of the hose assembly of FIG. 1, taken on lines 2—2 of FIG. 1 but on a larger scale, and showing one of the hose connector and spacer devices for the intermediate sections of the hose lengths;

FIG. 3 is a detail section of the hose assembly and hose connector and spacer device of FIG. 2, taken on lines 3—3 of FIG. 1, but on a larger scale;

FIG. 4 is a detail section of the hose connector and spacer of FIGS. 2 and 3 taken on lines 4—4 of FIG. 3;

FIG. 5 is a section of the hose assembly of FIG. 1, taken on lines 5—5 but on a larger scale and showing the other hose connector and spacer device, which can be used for the end sections of the hose lengths; and FIG. 6 is a top plan view of the hose assembly of FIG. 5 showing the hose connector and spacer device of FIG. 5.

Referring to the drawings, there is illustrated a bank of parallel hose 10a, 10b and 10c of the well-known marine type, adapted to be floated on water by any suitable means, for carrying liquids, such as oil or gasoline under high pressures. These hose 10a, 10b and 10c consist of lengths of reinforced rubber hose, having fittings at the opposite ends of each length, consisting of a nipple 12 and a mounting flange 13, by which these hose lengths can be secured together end to end by means of bolts 14.

For purpose of illustration, three parallel hose 10a, 10b and 10c, are shown of different sizes. For example, the two hose 10a and 10b may be 12" in inside diameter, while the third hose 10c may be 10" in inside diameter, the length of each hose unit or length between flange couplings may be about 30 feet, and the distance between the hose from center to center may be 42". The intermediate sections of the lengths of the hose 10a, 10b and 10c, are shown in FIGS. 1-4, connected by connector and spacer devices 15 embodying the present invention. Each of these hose connector and spacer devices 15 comprises a belting strap 16, made of strong flexible material, such as nylon, and comprising two similar sections 17a and 17b conjointly and tightly embracing the center hose 10b and having confronting outwardly turned flanges 18 secured together by bolts 19. A one-piece belting strap 22 of nylon or similar strong flexible material is wrapped tightly around the outside hose 10a and has marginal sections turned radially outwardly in confronting relationship towards the center hose 10b to form flanges 23 secured together by bolts 24. A third belting strap 25 made of one-piece of nylon or similar strong flexible material, is wrapped tightly around the other outside hose 10c and has marginal sections turned radially outwardly in confronting relationship towards the center 10b to form flanges 26 secured together by bolts 27.

Between the outside belting straps 22 and 25 and the middle belting strap 16 are the connecting means comprising flat plate hooks 30, 31, 32 and 33 of rigid material, such as steel or the like. Hooks 31 and 32 are clamped between the flanges 18 on the center belting strap 16, hook 30 is clamped between the flanges 23 on the belting strap 22 and hook 33 is clamped between the flanges 26 of the belting strap 25. Each of these plate hooks 30, 31, 32 and 33 has two holes for passage of the corresponding bolts 19, 24 and 27 therethrough; metal plate tabs 35 protect the flanges 18, 23 and 26 of the nylon belting straps 16, 22 and 25 against the direct compressive action of the bolts 19, 24 and 27 thereon. Also, each of these hooks 30, 31, 32 and 33 has a hole 36 elongated in a direction parallel to the longitudinal axes of the hose 10a, 10b and 10c. Passing through each of these holes 36 to form a joint therewith is a coupling or anchor shackle 37 made from a piece of flat sheet metal, such as steel, bent into U-shape, and having a cross-section smaller in all directions than the hook holes to permit the shackles limited play along and laterally of said holes, and generally angularly about longitudinal axes along said holes. A pin 40 passes through each shackle 37 and between the two pins on each side of the center hose 10b is a linking means comprising a circular thimble 41 in the form of a grooved circular disc, fitted with a snug rotative fit on the corresponding pins and a flexible wire rope 42, which has its ends connected together by a coupling sleeve 43 affixed thereto to form said rope into an endless cable loop and which passes around these thimbles. U-shaped clips 44 passing through metal straps 45 and held in position by nuts 46 threaded onto the legs of said clips, serve to crimp the cable loops 42 tightly around the thimbles 41. A block 47 of a resilient material, such as rubber, of any suitable cross-section, as for example of square cross-section, embraces each cable loop 42 and serves as a snubber or bumper to absorb shocks resulting from movements of the hose 10a, 10b and 10c towards each other.

The connections between the cable loop 42 and the shackles 37, form joints, permitting limited relative endwise movement of the hose 10a, 10b and 10c generally endwise about the vertical axes of the pins 40.

The connector and spacer devices 15 between the intermediate sections of the hose lengths between coupling flanges 13 afford limited free play to these intermediate sections in all directions against the resilient bumper action of the rubber snubbers 47, while maintaining these hose lengths substantially parallel, so that the action of the waves and currents on the hose 10a, 10b and 10c will not be destructive. Although the play permitted by the connector and spacer devices 15 is in all directions, it is confined generally in the two predetermined directions described. The anchor shackles 37 can move relative to the corresponding plate hooks 30, 31, 32 and 33 about axes along the holes 36 in said hooks parallel to the hose 10a, 10b and 10c, and these hose can move relatively endwise about the axes of the pins 40. The thimbles 41 on these pins 40 serve as pulleys in this operation.

In addition to the connector and spacer devices 15 described, additional connector and spacer devices 50, shown in FIGS. 1, 5 and 6, may be provided between the flanged-coupled parts of the hose 10a, 10b and 10c, when the intensities of the waves and currents are such as to warrant the use of such additional protective means. These additional connector and spacer devices 50 do not afford the free play that the connector and spacer devices 15 do, but permit relative universal angular movements of interconnected parts of the hose 10a, 10b and 10c about axes fixed with respect to said hose parts at right angles to each other. These connector and spacer devices 50 with predetermined axial play have special utility in interconnecting the flange-coupled parts of the hose 10a, 10b and 10c, where it is desired to so limit such play to definite angular movements to reduce the strains on the bolts at these flanged-coupled parts due to the action of the marine waves and currents. Each of these connector and spacer devices 50 comprises a flange adapter 54, having a segmental part 55 concentrically following the curvature of the corresponding flange 13 of one hose length and connected thereto by some of the bolts 14 which connect this flange to the flange of the adjoining hose section, and a pair of horizontal, vertically spaced hinge projections 56. Between each pair of confronting flange adapters 54 on laterally adjoining lengths of the hose 10a, 10b and 10c are links 57 and 58, each having a hinge tongue 60 at one end fitted snugly between the spaced projections 56 of a corresponding flange adapter 54, and pivotally secured thereto by a vertical hinge bolt 61, to form a knuckle joint therewith. At their confronting ends, one link 57 has a pair of spaced hinge projections 62 and the other link 58 has a hinge tongue 63 fitted snugly between these spaced projections and connected thereto by a horizontal hinge bolt 64 to form a knuckle joint therewith.

With the connector and spacer devices 50 described, the hose 10a, 10b and 10c at the flange couplings can move angularly about vertical axes at the hinge bolts 61, and at the same time can move angularly about horizontal axes at the hinge bolts 64 parallel to the longitudinal axes of the hose 10a, 10b and 10c. These relative universal movements of the hose 10a, 10b and 10c by the connector and spacer devices 50 at the flange-coupled ends of the hose lengths, are effected about fixed axes, thereby permitting these coupled ends to yield in predetermined directions under the forces of marine waves and currents, so that destructive stressing of the coupling flange bolts 14 is avoided. The intermediate parts of the lengths of hose 10a, 10b and 10c, not flange-coupled, are given greater freedom of play by means of the connector and spacer devices 15 therebetween, so that these intermediate hose parts can bend under the action of marine waves and currents while the flange-coupled parts are more restrained. The spacing of these connector and spacer devices 15 and 50 may vary according to the marine conditions encountered and both of these means may be selected when the marine conditions warrant it. Where the marine conditions are milder, either one of these types of connector and spacer devices alone, may be provided. The connector and spacer devices 15 and/or 50 may be provided as described, in the locations shown, or if desired the connector and spacer devices 15 may be located in the regions of the coupling flanges, the straps 16, 22 and 25 being wrapped around the nipples 12 adjoining the coupling flanges 13.

While the invention has been described with particular reference to specific embodiments, it is to be understood that it is not to be limited thereto but is to be construed broadly and restricted solely by the scope of the appended claims.

What is claimed is:

1. A connector and spacer device for a pair of marine hose extending substantially parallel, to maintain said hose against excessive relative displacement against the action of marine waves and currents, comprising means for interconnecting said hose and having joints permitting relative universal movements of the interconnected hose substantially lengthwise and also relatively angularly about axes extending along said hose.

2. A connector and spacer device as described in claim 1, said interconnecting means comprising belting straps adapted to be wrapped around and to embrace the hose respectively, coupling shackles, joint means between said shackles and said belting straps, permitting said shackles to swing angularly about axes extending along the hose, linking means between shackles, and hinge joints between the ends of said linking means and said shackles having axes permitting the interconnected hose to move generally relatively endwise about said axes.

3. A connector and spacer device as described in claim 2, comprising a pair of flange extensions at the ends of each of said belting straps turned in confronting relationship radially outwardly of the corresponding hose embraced by the latter belt, each of said joint means comprising a plate hook of rigid material connected to the corresponding pair of confronting flanges and having a hole, each shackle passing through the hole of the corresponding plate hook with sufficient play to permit said shackle to swing angularly in said hole about an axis extending along the interconnected hose.

4. A connector and spacer device as described in claim 2, said linking means comprising a flexible cable loop, each of said hinge joints comprising a hinge pin in upright position supported on a corresponding coupling shackle, and a thimble in the form of a peripherally grooved circular disc on said pin rotatable about the axis of said pin, said cable loop at its ends passing around and snugly embracing said thimbles with sufficient looseness to permit the interconnected hose to move generally endwise about said pin axes.

5. A connector and spacer device as described in claim 3, each of said coupling shackles being made from a piece of flat sheet metal, bent into U-shape and having a cross-section smaller in all directions than the hook holes, to permit the shackles limited play in the holes along the interconnected hose and angularly about axes extending along the interconnected hose.

6. A connector and spacer device as described in claim 2, comprising a pair of flange extensions at the ends of each of said belting straps turned in confronting relationship radially outwardly of the corresponding hose embraced by the latter belt, each of said joint means comprising a plate hook of rigid material connected to the corresponding pair of confronting flanges and having a hole, each of said coupling shackles being made from a piece of flat sheet metal bent into U-shape to form two legs and having a cross-section smaller in all directions than the hook holes, each shackle passing through the hole of the corresponding plate hook with sufficient play to permit said shackle to swing angularly in said hole about an axis extending along the interconnected hose, said linking means comprising a flexible cable loop, each of said hinge joints comprising a hinge pin in upright position supported in the legs of the corresponding coupling shackle, and a thimble in the form of a peripherally grooved circular disc on said pin rotatable about the axis of said pin, said cable loops at its ends passing around and snugly embracing said thimbles with sufficient looseness to permit the hose to move generally about said pin axes.

7. A connector and spacer as described in claim 1, said interconnecting means carrying bumper means to yieldably resist excessive movements of the interconnected hose towards each other.

8. A connector and spacer device for flexible marine hose as described in claim 1, said interconnecting means providing play permitting the interconnected hose to bend towards and away from each other in the regions where said hose are interconnected, said device including snubber means carried by said interconnecting means and acting as a bumper to resist resiliently excessive bending of the interconnected hose towards each other.

9. A connector and spacer device as described in claim 2, comprising a snubber block of resilient material supported on said linking means for resisting resiliently excessive movements of the interconnected hose towards each other.

10. A connector and spacer device as described in claim 4, comprising a snubber block of resilient material embracing said cable loop for resisting resiliently excessive movements of the interconnected hose towards each other.

11. A connector and spacer device as described in claim 1, said joints comprising means defining axes fixed in relation to the hose when interconnected by said device, two of said axes extending along respective interconnected hose, permitting the interconnected hose to move angularly about the latter two axes respectively, a third axis being located between said two axes and extending at right angles to said two axes, permitting the interconnected hose to move substantially endwise relatively about said third axis.

12. A connector and spacer device as described in claim 1, said joints constituting knuckle joints.

13. A connector and spacer device for a pair of flexible marine hose extending substantially parallel to maintain said hose against excessive displacement against the action of marine waves and currents, and made up of hose lengths with end flanges coupled together, comprising flange adapters adapted to be connected to said hose flanges, and means for interconnecting said adapters and having joints permitting relative universal movements of the interconnected hose substantially lengthwise and also relatively angular about axes extending along said hose.

14. A connector and spacer device as described in claim 13, said joints constituting three hinge joints, said interconnecting means comprising two links, extending end to end between said flange adapters and articulated at adjoining ends by one of said hinge joints having an axis extending in a direction at right angles to the axes of the hose when interconnected, and articulated at their other ends to the flange adapters by the two other hinge joints having axes extending along the interconnected hose.

15. A connector and spacer device as described in claim 14, said hinge joints constituting knuckle joints.

16. In combination, a plurality of floating flexible marine hose extending substantially parallel in water and subject to the action of marine waves and currents, each of said hose being made up of hose lengths with end fitting flanges coupled together, and means interconnecting said hose and having joints permitting relative universal movements of the hose under the action of marine waves and currents substantially lengthwise and also relatively angularly about axes extending along said hose.

17. The combination described in claim 16, said interconnecting means being secured to the intermediate sections of the hose lengths between the flanges.

18. The combination described in claim 16, said interconnecting means being secured to the flange sections of the hose lengths.

19. The combination described in claim 16, two types of interconnecting means being provided, one type being secured to the intermediate sections of the hose lengths between the flanges, the other type being secured to the flange sections of the hose lengths.

References Cited

UNITED STATES PATENTS

| | | | |
|---|---|---|---|
| 3,055,398 | 9/1962 | Tunnessen | 138—111 |
| 3,236,267 | 2/1966 | Bily | 137—236 X |
| 3,311,132 | 3/1967 | McWilliams | 138—111 |
| 3,375,856 | 4/1968 | Howard et al. | 138—106 |

ALFRED R. GUEST, *Primary Examiner.*